United States Patent Office 3,407,065
Patented Oct. 22, 1968

3,407,065
PHOTOSENSITIVE LITHOGRAPHIC PLATE COATING COMPRISING DICHROMATED COLLOID AND UNMORDANTED MORDANT DYE
Lyman Chalkley, Prince Georges County, Md. (6626 Tyrian St., La Jolla, Calif. 92037)
No Drawing. Filed Oct. 28, 1964, Ser. No. 407,246
14 Claims. (Cl. 96—33)

ABSTRACT OF THE DISCLOSURE

The objective of the present invention is an improvement in bichromate sensitized lithographic plate coatings whereby a visible image is printed out during the exposure of the plate and before development. The image so obtained is useful as a guide for photocomposing, staging and any other manual operation that needs to be carried out between initial exposure and development of the plate.

This objective is attained by the addition to the bichromate sensitized coating of a mordant dye in its unmordanted form. During exposure the color of the mordant dye, hue as well as density, changes to provide an image in which hue contrast plays an important role.

---

This invention relates to a photosensitive lithographic plate coating, and more particularly to a dichromate sensitized colloid coating that prints out a strong visible image during exposure.

Photosensitive coatings of organic colloids containing a dichromate have been known for over a hundred years and are still used extensively in the preparation of lithographic printing plates. In spite of its outstanding advantages, the dichromate sensitized colloid lithographic plate has the drawback that the image produced by the photographic exposure is almost invisible until it has been developed. Thus operations of staging, stopping out and the location of images for photocomposing on the undeveloped plate are hampered and made difficult by the poor visibility of the undeveloped image.

A purpose of the present invention is to provide a dichromated colloid lithographic plate that prints out a strong visible image during exposure. This has the advantage over previous plates that the visible image greatly increases the ease and speed of photocomposing, staging and stopping out operations while retaining the intrinsic merits of the dichromate sensitized colloid process. Other advantages will be seen in the following description.

The present photosensitive coating contains in addition to the organic colloid and dichromate a dyestuff that changes color as a result of the photochemical reaction that takes place during the normal printing of the plate. I have found that the class of dyes known as mordant dyes have this property.

The mordant dye is added in its unmordanted form to the dichromate and organic colloid coating solution. When the dried coating is exposed to light the familiar colloid hardening reaction is accompanied by a color change due to the presence of the added mordant dye, while the color of the unexposed portions of the coating remains unchanged. The result is the formation of a strong visible image.

Commercial synthetic mordant dyes may be used in the process. A list of them is given in the Colour Index, second edition, volume 1, pages 1405 to 1616. The natural mordant dyes may also be used. For the lithographic plate coating the mordant violets, mordant blues, mordant greens mordant browns and mordant blacks are preferred as yielding the strongest images. Especially useful subgroups of the mordant dyes are the triphenylmethane mordant dyes, the anthraquinone mordant dyes, the azo (including monoazo, disazo, trisazo and polyazo subgroups) mordant dyes, the xanthene mordant dyes and the oxazine mordant dyes. The water soluble mordant dyes are preferred for use with hydrocolloids and the alcohol soluble dyes with the alcohol soluble colloids such as shellac, zein and polyvinyl acetate.

The usual colloids employed in lithographic plate coatings are suitable for the present coating. Examples are: albumen, casein, soybean protein, glue, gelatine, zein, gum arabic, mesquite gum, karaya gum, dextrin, polyvinyl alcohol, polyvinyl acetate, polyvinyl pyrrolidone, methyl cellulose, ethyl cellulose and shellac.

Ammonium dichromate and any of the other dichromates used in conventional lithographic plate coatings may be employed. The term "dichromate" is used here to include the dichromates and the chromates that may be formed from them by addition of ammonium hydroxide or other alkali to a dichromate solution.

The plate base may be any of those now employed in lithography, such as aluminum, zinc, chromium and paper.

The addition of the mordant dye does not interfere with the exposure and processing usual with dichromate sensitized colloid coatings, and plates coated with the mordant dye preparation may be exposed and processed by the methods normal for use with similar coatings that do not contain the mordant dye.

Unchanging pigments and dyestuffs have long been used in dichromate sensitized coatings to give a visible color to the light-hardened colloid film left after exposure and the development that removes the unhardened colloid. The gum bichromate and carbon processes, both known for over sixty years, are examples of the use of pigmented dichromate sensitized colloid films. Lithographic plate coatings of dyed hydrocolloids sensitized with dichromates have been used for many years in the same way to yield visible images after development. In all of these processes the dyes and pigments employed in the dichromate sensitized colloid films have held their original colors through the exposure and yielded no printed out image. The exposed and unexposed portions of these films had the same color, and only when the unexposed portions were washed away did the color remaining in the exposed hardened portions of the film take on the form of the image by contrast with the differently colored support on which the film was coated. In the present films containing mordant dyes the color of the dye changes during the exposure to produce a visible image before development.

The nature of the color change during exposure has not been clearly established and the use of the present sensitized coating is not limited to any particular theory of the mechanism of the color change. It is believed, however, that the color change is not due to a photochemically induced change in the mordant dye but rather to a reaction of the mordant dye with a product of the photoreaction of the colloid with the dichromate. This reaction is believed to produce a mordant with which the mordant dye reacts with a change in color. In 1855 De Beauregard disclosed that when a piece of paper impregnated with a dichromate was exposed to light and subsequently soaked in an extract of logwood, which contains the mordant dye haematin, an image appeared. Presumably a mordant was formed by the exposure of the dichromated paper and this in turn was capable of extracting the mordant dye from solution. That an apparently similar reaction could take place during the exposure of a lithographic plate coating containing colloid, dichromate and mordant dye all together at the same time does not appear to have been known before the present disclosure.

The proportions of the constituents of the coating solutions are not critical. The ratios of dichromate and colloid presently employed in lithographic plate coatings are suitable. The mordant dye is conveniently added in the proportion of 1% to 100% of the weight of the dichromate in the coating.

The invention is disclosed further in the following examples, which are set forth as being illustrative but not limiting. Other combinations and procedures embodying the invention will be apparent to those skilled in the art.

Example 1

A sensitized coating for a deep etch plate is made as follows: dissolve 2 grams of Mordant Blue 3 in 90 ml. of hot water and cool the solution to 25° C. Add 20 ml. of concentrated ammonium hydroxide solution and 20 grams of ammonium dichromate. Stir until the latter has dissolved. Mix the resulting solution with 300 ml. of 14° Bé. gum arabic solution.

The resulting clear red solution may be coated onto a grained aluminum plate on a whirler operating at 60 r.p.m. and dried in a stream of air. The dried sensitive film has a pale brown color. When printed behind a positive by arc light a dark chocolate brown image prints out. It aids in photocomposing and any staging or stopping out operations performed before development. The printed image also persists through the process of development by the usual acidified calcium chloride solution. Etching, copperizing and further processing are carried out in the usual manner for gum arabic coated deep etch plates.

Example 2

A polyvinyl alcohol coating is prepared as follows. One gram of commercial concentrated ("200%") Mordant Blue 1 is dissolved by heating in 1 liter of water. The solution is cooled to 25° C. and 100 grams of low viscosity "88% hydrolyzed" polyvinyl alcohol (Elvanol 51–05 manufactured by E. I. du Pont de Nemours & Co., Wilmington, Del.) is added with vigorous stirring. Stirring is continued while the mixture is heated in a boiling water bath until the polyvinyl alcohol dissolves. The solution is cooled to 25° C. when 20 ml. of concentrated ammonium hydroxide and 100 ml. of 10% ammonium dichromate are added. The resulting coating solution is clear and orange red.

A grained aluminum plate is coated on a whirler operated at 60 r.p.m. and dried in a stream of air. The dried film has a pale chartreuse green color. When printed behind a transparency by carbon arc light a dark bluish gray image prints out to form a readily visible aid for photocomposing, staging, etc. The color of the printed image persists in the hardened polyvinyl alcohol film through development.

Example 3

A sensitized albumen coating for a surface plate is made as follows. Two grams of the free acid form of Mordant Violet 39 is dissolved by stirring at room temperature in a mixture of 20 ml. of concentrated ammonium hydroxide and 140 ml. of water. Twenty grams of ammonium dichromate is added and dissolved by stirring at room temperature. Two hundred and thirty ml. of fresh egg white is then added and stirred to a homogeneous mixture.

A grained aluminum plate is coated on a whirler operating at 60 r.p.m. and dried in a stream of air to a pale tan film. When printed behind a negative by exposure to arc light a cinnamon brown image prints out and provides a clearly visible guide for photocomposing, etc. Color persists in the image through development by water.

I claim:
1. A photosensitized lithographic plate comprising a lithographic plate base coated with a dichromate sensitized colloid containing a mordant dye in its unmordanted form, which dye changes color as a result of a photochemical reaction.
2. A photosensitive lithographic plate as described in claim 1 wherein the dye is chosen from the subgroup consisting of anthraquinone mordant dyes, triphenylmethane mordant dyes, azo mordant dyes, xanthene mordant dyes and oxazine mordant dyes.
3. A photosensitive lithographic plate as described in claim 1 wherein the dye is the unmordanted form of a triphenylmethane mordant dye.
4. A photosensitive lithographic plate as described in claim 1 wherein the dye is the unmordanted form of an anthraquinone mordant dye.
5. A photosensitive lithographic plate as described in claim 1 wherein the dye is the unmordanted form of an azo mordant dye.
6. A photosensitive lithographic plate as described in claim 1 wherein the dye is the unmordanted form of a xanthene mordant dye.
7. A photosensitive lithographic plate as described in claim 1 wherein the dye is the unmordanted form of an oxazine mordant dye.
8. The process comprising the steps of coating a lithographic plate base with the composition of claim 1, and printing said coated plate behind a transparency in the normal manner for printing lithographic plates until the exposed coating has been hardened, whereby a visible image is formed without development.
9. The process comprising the steps of coating a lithographic plate base with the composition of claim 2 and printing said coated plate behind a transparency in the normal manner for printing lithographic plates until the exposed coating has been hardened, whereby a visible image is formed without development.
10. The process comprising the steps of coating a lithographic plate base with the composition of claim 3 and printing said coated plate behind a transparency in the normal manner for printing lithographic plates until the exposed coating has been hardened, whereby a visible image is formed without development.
11. The process comprising the steps of coating a lithographic plate base with the composition of claim 4 and printing said coated plate behind a transparency in the normal manner for printing lithographic plates until the exposed coating has been hardened, whereby a visible image is formed without development.
12. The process comprising the steps of coating a lithographic plate base with the composition of claim 5 and printing said coated plate behind a transparency in the normal manner for printing lithographic plates until the exposed coating has been hardened, whereby a visible image is formed without development.
13. The process comprising the steps of coating a lithographic plate base with the composition of claim 6 and printing said coated plate behind a transparency in the normal manner for printing a lithographic plate until the exposed coating has been hardened, whereby a visible image is formed without development.
14. The process comprising the steps of coating a lithographic plate base with the composition of claim 7 and printing said coated plate behind a transparency in the normal manner for printing a lithographic plate until the exposed coating has been hardened, whereby a visible image is formed without development.

References Cited

FOREIGN PATENTS 29,112  12/1913  Great Britain.
29,113   1/1914  Great Britain.

(Other references on following page)

OTHER REFERENCES

Venkataraman, K., Synthetic Dyes, New York, Academic Press Inc., 1952, vol. 2, pp. 710, 744.

Wood, W., "Light Sensitive Coatings for Lithography," The National Lithographer, January 1938, pp. 30-31.

Diserens, L., The Chemical Technology of Dyeing and Printing, New York, Reinhold Pub. Corp., 1948, pp. 410-411.

Rawson, C., et al., A Dictionary of Dyes, Mordants and Other Compounds, London, Chas. Griffin and Co., 1901, pp. 233-234.

Jorgensen, G., et al., The Sensitivity of Bichromated Colloids, 1954, pp. 1-3 and 123.

Knecht, E., et al., A Manual of Dyeing, vol. 2, 1910, pp. 532-533.

NORMAN G. TORCHIN, *Primary Examiner.*

C. E. DAVIS, *Assistant Examiner.*